United States Patent
Rykhlinski et al.

(10) Patent No.: US 7,737,699 B2
(45) Date of Patent: Jun. 15, 2010

(54) METHOD OF MARINE ELECTROMAGNETIC SURVEY USING FOCUSING ELECTRIC CURRENT

(75) Inventors: Nikolaj Ivanovich Rykhlinski, Moscow (RU); Sofia Nikolaevna Davydycheva, Moscow (RU); Anatoli Semenovich Lisin, Troitsk (RU)

(73) Assignee: Valentin TSOY, Moscow (RU)

( * ) Notice: Subject to any disclaimer, the term of this patent is extended or adjusted under 35 U.S.C. 154(b) by 388 days.

(21) Appl. No.: 11/921,386

(22) PCT Filed: Apr. 19, 2006

(86) PCT No.: PCT/RU2006/000193

§ 371 (c)(1),
(2), (4) Date: Nov. 30, 2007

(87) PCT Pub. No.: WO2006/130043

PCT Pub. Date: Dec. 7, 2006

(65) Prior Publication Data

US 2009/0121719 A1    May 14, 2009

(30) Foreign Application Priority Data

Jun. 1, 2005   (RU) ............................... 2005116728

(51) Int. Cl.
G01V 3/15 (2006.01)
G01V 3/06 (2006.01)
G01V 1/40 (2006.01)

(52) U.S. Cl. ................. 324/365; 324/358; 324/363; 702/6

(58) Field of Classification Search .............. 324/347, 324/354, 357, 358, 360, 362, 363, 365; 702/6, 702/11
See application file for complete search history.

(56) References Cited

U.S. PATENT DOCUMENTS

| | | | |
|---|---|---|---|
| 4,617,178 A | 10/1986 | Nichols | |
| 5,068,619 A * | 11/1991 | Nakano et al. | 324/715 |
| 6,236,211 B1 | 5/2001 | Wynn | |
| RE39,844 E * | 9/2007 | Srnka | 324/354 |
| RE40,321 E * | 5/2008 | Srnka | 324/354 |

FOREIGN PATENT DOCUMENTS

| | | |
|---|---|---|
| RU | 2236028 | 9/2004 |
| SU | 1122998 | 1/1984 |

* cited by examiner

Primary Examiner—Kenneth J Whittington
(74) Attorney, Agent, or Firm—Frishauf, Holtz, Goodman & Chick, P.C.

(57) ABSTRACT

Two embodiments of marine geo-electric probe methods for hydrocarbon deposits survey comprise—excitation of electromagnetic field in a surveyed medium by transmitting two rectangular current pulses therethrough, the first—during forward traveling of a probe device along a profile and the second—during backward traveling thereof,—measuring instant values of the first and second electric potential differences during the time between the pulses, wherein, the equal-zero condition of the electric potential differences along the profile is ensured,—calculating three sets of normalized electrical parameters based on difference values,—solving an inverse problem via a differential equation for the dipole source voltage in an electrochemically polarizable medium using the parameters,—producing data according to said electrical parameters, and—determining conductivity of the medium, induced-polarization factor and decay time constant of the polarization potential difference. The first embodiment is deployed for circular survey profiles, the second is for linear profiles.

2 Claims, 5 Drawing Sheets

METHOD OF MARINE ELECTROMAGNETIC SURVEY USING FOCUSING ELECTRIC CURRENT

CROSS-REFERENCE TO RELATED APPLICATIONS

This application is a U.S. national phase application of a PCT application PCT/RU2006/000193 filed on 19 Apr. 2006, published as WO2006/130043, whose disclosure is incorporated herein in its entirety by reference, which PCT application claims priority of a Russian patent application RU2005/116728 filed on 1 Jun. 2005.

FIELD OF THE INVENTION

The invention refers to the domain of geophysical studies—specifically to methods of marine geological electromagnetic (EM) survey with the use of controllable artificial sources of electromagnetic field. It is designed for exploration and delineation of oil and gas offshore deposits of the sea shelf, and is based on the separate determination and mapping of three specific electro-physical parameters of geological formation layers: specific electric conductivity, induced polarization, and a time decay constant of the potential difference of induced polarization.

BACKGROUND OF THE INVENTION

There are known methods of EM survey, in particular a marine controllable source EM survey, based on controlled electric current excitation of a surveyed medium (methods of resistance to direct and alternative current), that allow to determine only one electrophysical parameter of the three listed above, namely, the electric resistivity, that is often not enough for exploration and delineation of the oil-gas deposits. The most popular method among them is referred to as a pulse alternative low-frequency current method, which is an establishing electrical field method.

According to field data, measured with respect to this method, an electric resistivity pr is calculated by means of a fundamental formula:

$$\rho_r = K \cdot \Delta U / J, \quad (1)$$

wherein:
J is a measured surge of electric current in a dipole electrical source;
ΔU is a measured voltage at the ends of receiving ground electrodes MN;
K—is the geometrical factor of a probe device.
(referring to "Electric survey", Geophysician Handbook, Tarkhov et al., Moscow, Nedra, 1980, p. 237 and pp. 422-406).

When using such an approach, traditionally applied for geoelectrical surveys with a controllable current source, only summarized data about elements of the geological formation structure can be obtained, in which structure the field is developed. The reason is that the spatial distribution of the current density J produced by the source is uncontrollable, and any information about this distribution in the real three-dimensional heterogeneous media is not available. This means that the normalization of measured electrical voltage ΔU by means of dividing it by source current intensity J, is senseless, since J carries no information about the surveyed medium, but reflects information about the power of the current source and the contact resistance of grounded electrodes of the dipole source.

Thus, the aforesaid resistivity methods are hardly applicable for exploration and delineation of oil and gas deposits, at least for two reasons: first, only one of the mentioned three electrophysical parameters of the surveyed medium needed for this purpose is registered; and second, the registered parameter is too rough, because it measures resistivity of the whole volume of the geological formation, in which the source's electrical field propagates. This happens due to the absence of any electric current focusing.

Due to specificity of the measuring during motion, marine EM surveys typically employ a symmetric measuring setup AMNB or a dipole axial setup ABMN.

Attempts of oil and gas deposits exploration were performed in Black Sea and in Barents Sea by "Soliton" and "Sevmorgeo" geophysical crews. Only the qualitative interpretation was performed. Signals were charted, and anomalous zones associated with oil and gas deposits were detected, according to an interpretation of the present inventors. However, signals of establishing field anomalies were sometimes observed, which reflected the presence of shallow gas deposits in rather simple geological environment, that is, on the Black Sea offshore. (Petrov, A. A., "Capacities of the electric field development method for offshore oil and gas exploration, Geophysics, No 5, 2000, EAGO, Moscow, p. 21).

For more complex geological environments, the anomalies of field establishing signals, obtained by AMNB and ABMN setups, are not necessary related to hydrocarbons deposits.

There exists a method of the marine EM survey that includes excitation of electromagnetic field in a surveyed formation by passing rectangular current pulses, with pauses between them, and measuring the first potential differences (voltages) at several distances from the excitation power source. (Belash, V. A., "A method of marine geological electric survey", Patent of the U.S. Ser. No 1122998 from Mar. 6, 1983, Bulletin No 41, 1984). An essential disadvantage of this method is the absence of a focusing of the electric current that excludes the horizontal components of electric current density jx or $j_y$ in the observation point. This disadvantage does not allow solving the inverse problem by using the known solution of a mathematical physics equation for one-dimensional medium with sub-horizontal boundaries, which is needed for research of the natural heterogeneous three-dimensional media. For this reason, the inverse problems for this approach in the 3D heterogeneous media cannot be solved correctly, and the separation of the parameters, such as the electric conductivity and the induced polarization is dubious.

BRIEF SUMMARY OF THE INVENTION

The present method solves the problem of exploration and delineation of offshore oil and gas deposits, including the deposits located under deep water.

The technological effect includes the opportunity to separate the electric conductivity and the induced polarization parameters, and the additional opportunity to determine an important third parameter: a time decay constant of the induced polarization effect.

The above-mentioned technological effect is achieved in the following way:
a marine geological EM survey method comprises the following steps:
  excitation of electromagnetic field in a surveyed medium by passing rectangular current pulses therethrough, with pauses therebetween, and measured along series of circularly shaped probe profiles, the pulses are passed from a dipole electric source located on one of the circular profiles, wherein two identical rectangular pulses are passed through the medium, as follows: a first pulse is passed by moving the probe device clockwise, and the second pulse is passed by moving the probe device in the counterclockwise direction;

measuring the first and the second differences of electric potentials during the pauses, while the transient signal still exists, with a constant time interval, at every probe point located behind the dipole source being towed at the angular distance of 90 degree along the profile line, wherein the following condition is provided: the resultant axial potential difference along the profile is equal to zero, to eliminate the effect of the axial component of the current density under the probe point;

a focusing coefficient $\kappa(t_i)$ is thereafter obtained from the equation:

$$\Delta U_y(t_i)_{forward} - \kappa(t_i) \cdot \Delta U_y(t_i)_{backward} = 0;$$

three sets of the dipole-source-independent normalized EM parameters are calculated from the measured differences of electric potentials:

$$\frac{\Delta^2 U_y(t_i)_{forward} + \kappa(t_i) \cdot \Delta^2 U_y(t_i)_{backward}}{\Delta U_y(t_i)_{forward}},$$

$$\frac{\Delta^2 U_y(t_i, \Delta t)_{forward} + \kappa(t_i) \cdot \Delta^2 U_y(t_i, \Delta t)_{backward}}{\Delta U_y(t_i)_{forward}},$$

$$\frac{\Delta^2 U_y(t_i, \Delta t)_{forward} + \kappa(t_i, \Delta t) \cdot \Delta^2 U_y(t_i, \Delta t)_{bacrward}}{\Delta U_y(t_i, \Delta t)_{forward}},$$

where:

$\Delta t$ is a time interval between two nearest measurements of instant electric potential differences during the transient process signals existence;

$\Delta U_y(t_i)_{forward}$, $\Delta U_y(t_i)_{backward}$, $\Delta^2 U_y(t_i)_{forward}$, $\Delta^2 U_y(t_i)_{backward}$—are instant magnitudes of the first and second differences of the electric potential, measured at the probe point located at the circular probe line, at the angular distance of 90 degree with respect to the center of the dipole source, during the current pauses in the equal time intervals $\Delta t$, while the transient signals still exist, by clockwise and counter-clockwise movement of the probe device;

$\Delta U_y(t_i, \Delta t)_{forward}$, $\Delta U_y(t_i, \Delta t)_{backward}$, $\Delta^2 U_y(t_i, \Delta t)_{forward}$, $\Delta^2 U_y(t_i, \Delta t)_{backward}$—are the magnitudes of the differences between two nearest in time instant magnitudes of the first and the second differences of the electric potentials of the transient process with the time intervals $\Delta t$;

performing group probe measurements at predetermined neighboring profile points along the entire profile line, and normalized EM measured parameters for each group are summarized, and the following average values are obtained:

$$\frac{1}{n}\sum_1^n \frac{\Delta^2 U_y(t_i)_{forward} + \kappa(t_i) \cdot \Delta^2 U_y(t_i)_{backward}}{\Delta U_y(t_i)_{forward}},$$

$$\frac{1}{n}\sum_1^n \frac{\Delta^2 U_y(t_i, \Delta t)_{forward} + \kappa(t_i) \cdot \Delta^2 U_y(t_i, \Delta t)_{backward}}{\Delta U_y(t_i)_{forward}},$$

$$\frac{1}{n}\sum_1^n \frac{\Delta^2 U_y(t_i, \Delta t)_{forward} + \kappa(t_i, \Delta t) \cdot \Delta^2 U_y(t_i, \Delta t)_{backward}}{\Delta U_y(t_i, \Delta t)_{forward}},$$

where:

n is a number of probe points in each of groups;

using said values and the differential equation of mathematical physics for electric field of a dipole source in an electrochemically polarizing conductive medium $$\nabla^2 \dot{E}(i\omega) = i\omega\mu \cdot \sigma(i\omega, \sigma_0, \eta, \tau) \cdot \dot{E}(i\omega),$$

where:

$\nabla^2$ is the Laplas operator, $\dot{E}(i\omega)$ is an electric field excited by a dipole source, expressed for an equation for harmonic alterations of the electric field in time;

$\sigma(i\omega, \sigma_0, \eta, \tau)$ is a frequency-dependent electric conductivity of the medium, $\sigma_0$ is an electric conductivity of the medium, regardless the influence of the induced polarization, $\eta$ is a coefficient of induced polarization, $\tau$ is a time decay constant for potential difference due to induced polarization;

solving an inverse mathematical problem to determine three electro-physical parameters proprietary for each element of the medium: the electric conductivity $\sigma_0$, the coefficient of induced polarization $\eta$, and the time decay constant for potential difference $\tau$;

plotting three time charts according to said determined three electro-physical parameters.

The indicated technological effect is also attained through the marine geological EM survey method for survey of a medium comprising the steps of:

excitation of electromagnetic field within a surveyed medium along an axis of a strait line probe profile, by passing rectangular current pulses therethrough, with pauses therebetween, and measured along series of circularly shaped probe profiles, the pulses are passed from a dipole electric source located on one of the circular profiles, wherein two identical rectangular pulses are passed through the medium, as follows: a first pulse is passed by moving the probe device clockwise, and the second pulse is passed by moving the probe device in the counterclockwise direction;

measuring instantaneous values of a first and a second axial electrical potential differences with a constant time interval at each probe point during the entire time of existence of transient process signals;

providing the resulting axial difference of electrical potentials to be zero along the probe line to neglect the axial component of the current density under the probe point.

estimating a focusing coefficient $\kappa(t_i)$ from the equation $$\Delta U_x(t_i)_{foward} - \kappa(t_i) \cdot \Delta U_x(t_i)_{backward} = 0;$$

calculating three sets of normalized electrical parameters independent on the dipole source's current intensity:

$$\frac{\Delta^2 U_x(t_i)_{forward} + \kappa(t_i) \cdot \Delta^2 U_x(t_i)_{backward}}{\Delta U_x(t_i)_{forward}},$$

$$\frac{\Delta^2 U_x(t_i, \Delta t)_{forward} + \kappa(t_i) \cdot \Delta^2 U_x(t_i, \Delta t)_{backward}}{\Delta U_x(t_i)_{forward}},$$

$$\frac{\Delta^2 U_x(t_i, \Delta t)_{forward} + \kappa(t_i, \Delta t) \cdot \Delta^2 U_x(t_i, \Delta t)_{backward}}{\Delta U_x(t_i, \Delta t)_{forward}},$$

where:

$\Delta t$ is a constant time interval between two nearest values of electrical potential differences during the existence of the transient process signals;

$\Delta U_x(t_i)_{forward}$, $\Delta U_x(t_i)_{backward}$, $\Delta^2 U_x(t_i)_{forward}$, $\Delta^2 U_x(t_i)_{backward}$ are instantaneous values of the first and the second differences of the axial electrical potentials measured with the time interval $\Delta t$ in the current pauses during the entire time of existence of the transient process signals when the probe device moves forwards and backwards along the probe profile line;

$\Delta U_x(t_i,\Delta t)_{forward}$, $\Delta U_x(t_i,\Delta t)_{backward}$, $\Delta^2 U_x(t_i,\Delta t)_{forward}$, $\Delta^2 U_x(t_i,\Delta t)_{backward}$ are differences between nearest instantaneous values of the first and the second axial differences of the transient process electrical potentials measured within the time interval $\Delta t$;

performing the measurements in groups of neighboring probe points at certain regions of the probe line along its entire length;

summarizing normalized electrical parameters for each of groups of probe points to obtain the following average values:

$$\frac{1}{n}\sum_{1}^{n} \frac{\Delta^2 U_x(t_i)_{forward} + \kappa(t_i) \cdot \Delta^2 U_x(t_i)_{backward}}{\Delta U_x(t_i)_{forward}},$$

$$\frac{1}{n}\sum_{1}^{n} \frac{\Delta^2 U_x(t_i, \Delta t)_{forward} + \kappa(t_i) \cdot \Delta^2 U_x(t_i, \Delta t)_{backward}}{\Delta U_x(t_i)_{forward}},$$

$$\frac{1}{n}\sum_{1}^{n} \frac{\Delta^2 U_x(t_i, \Delta t)_{forward} + \kappa(t_i, \Delta t) \cdot \Delta^2 U_x(t_i, \Delta t)_{backward}}{\Delta U_x(t_i, \Delta t)_{forward}},$$

where:

n is the number of probe points in a group;

solving a mathematical inverse problem through using these values and the following differential equation of the mathematical physics describing the intensity of an electrical field induced by a dipole source in a electrochemical polarizing conductive medium $\nabla^2 \dot{E}(i\omega) = i\omega\mu \cdot \sigma(i\omega\sigma_0\eta\tau) \cdot \dot{E}(i\omega)$ where:

$\nabla^2$ is the Laplacian, $\dot{E}(i\omega)$ is the intensity of the electrical field induced by a dipole source expressed in the equation for the case of harmonic changes of the field intensity in time, $\sigma(i\omega\sigma_0\eta\tau)$ is the frequency dependent electro-conductivity of medium's elements, $\sigma_0$ is the electro-conductivity of the medium's elements without taking into account the induced polarization, $\eta$ is the induced polarization coefficient, $\tau$ is the fall-time constant of the induced polarization potential difference;

to estimate three electro-physical parameters characterizing each of the medium's elements: the specific electro-conductivity $\sigma_0$, the induced polarization $\eta$, and the fall-time constant of the induced polarization potential difference $\tau$.

plotting three cross-sections graphs of these parameters in the time domain.

BRIEF DESCRIPTION OF DRAWINGS

FIGS. 2(a) and 2(b) show diagrams of a circular profile line for the realization of the first embodiment of the proposed method, wherein:

FIG. 2(a) shows a movement of a probe device along the circular line clockwise,

FIG. 2(b) shows a similar movement counterclockwise.

Figure 1:
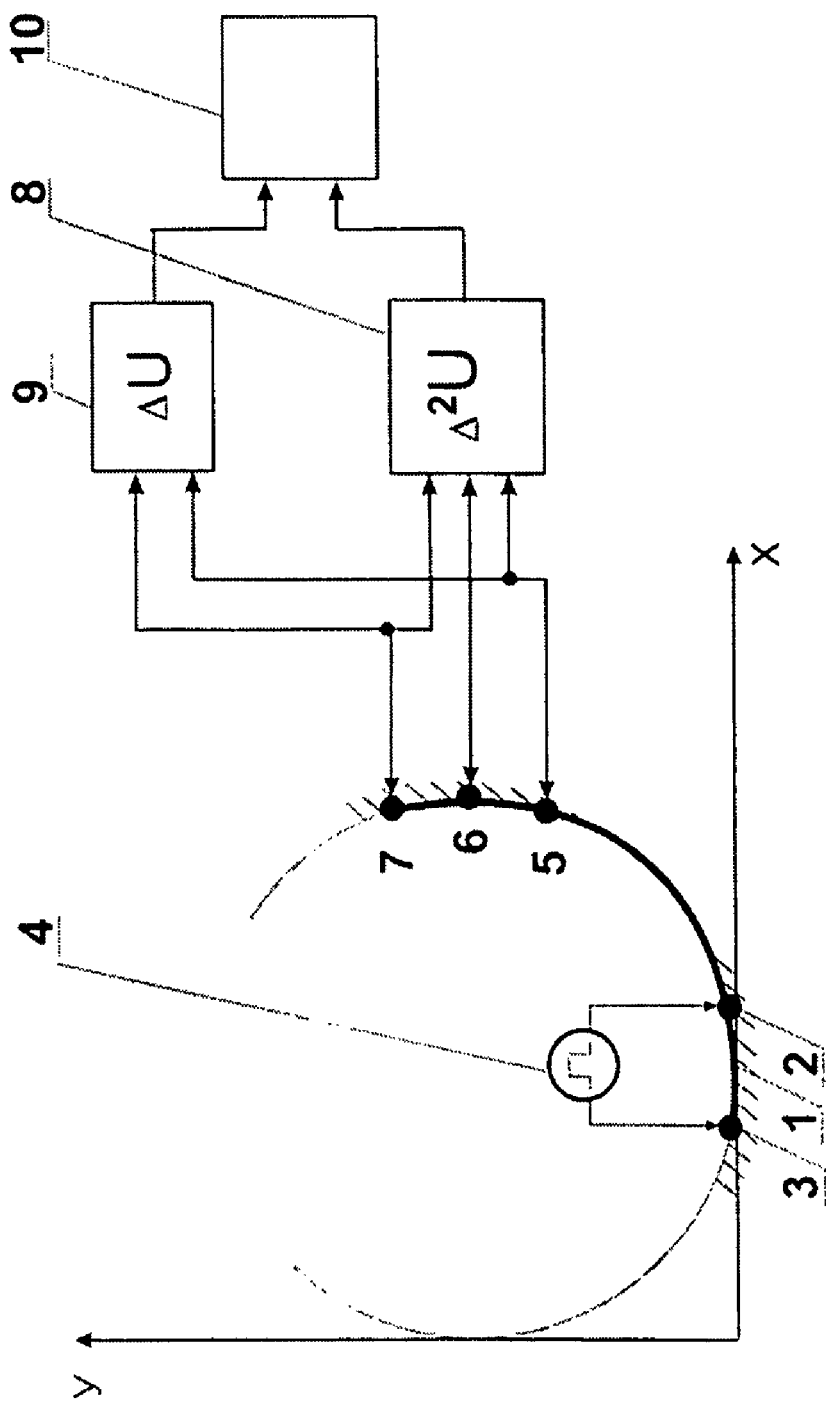
FIG. 1 shows a block-scheme of a probe device according to a first embodiment of the proposed method.

DESCRIPTION OF PREFERRED
EMBODIMENTS OF THE INVENTION

While the invention may be susceptible to embodiment in different forms, there is shown in the drawings, and will be described in detail herein, a specific embodiment of the present invention, with the understanding that the present disclosure is to be considered an exemplification of the principles of the invention, and is not intended to limit the invention to that as illustrated and described herein.

A probe device (shown on FIG. 1) comprises electrodes 2 and 3 of an electric dipole source (of a current dipole type AB), submerged in water 1, connected to a generator 4 of rectangular current pulses. The probe device is implemented making use of two sensors for measuring the first and the second differences of electrical potentials.

The sensors include electrodes 5 (corresponds to $-M_1$, on FIG. 2), 6 (corresponds to $-N$ on FIG. 2), 7 (corresponds to $-M_2$ on FIG. 2) for measuring the potential differences, disposed along the circular profile line, with equal intervals. The angular distance between the electrode N and the center of the dipole source AB is 90°.

The device comprises a digital sensor 8 for measuring the second potential difference of electric field $\Delta^2 U$ between the electrodes $M_1 N M_2$ and a digital sensor 9 for measuring the first potential difference of electric field $\Delta U$ between the electrodes $M_1 M_2$, and a computing block 10 for registration and processing signals of the digital sensors 8 and 9.

Figure 2:
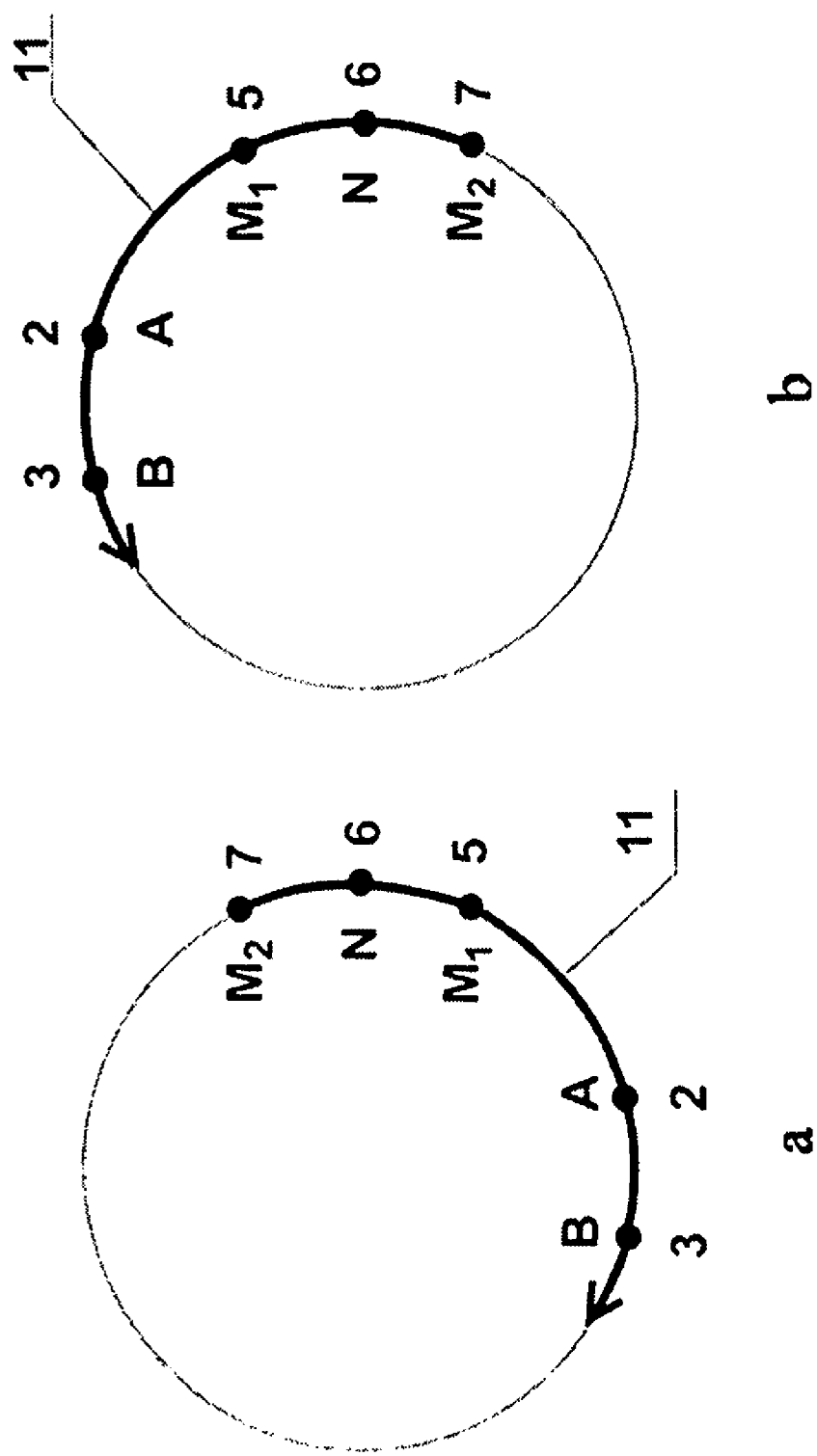

FIG. 2 shows the diagram of a circular profile line for implementation of the first embodiment of the proposed method, using tri-electrode sensor measuring the first and the second differences of electric potentials along a circular profile line 11, at an angular distance of 90° from the dipole source AB. The measurement of the potential differences $\Delta U_y(t_i)$ and $\Delta^2 U_y(t_i)$ is needed for the marine probes in deep water (50-1000 m) because these differences are absent in transient process' signals within the first isotropic non-polarizable layer (sea water) (Zhdanov, M. S., "Electric survey", Moscow, "Nedra", 1986, p. 259). This essentially increases the possibility to perform offshore survey and hydrocarbons exploration in deep water due to the suppression of screening influence of the highly conductive seawater layer upon the results of measurements.

Figure 3:
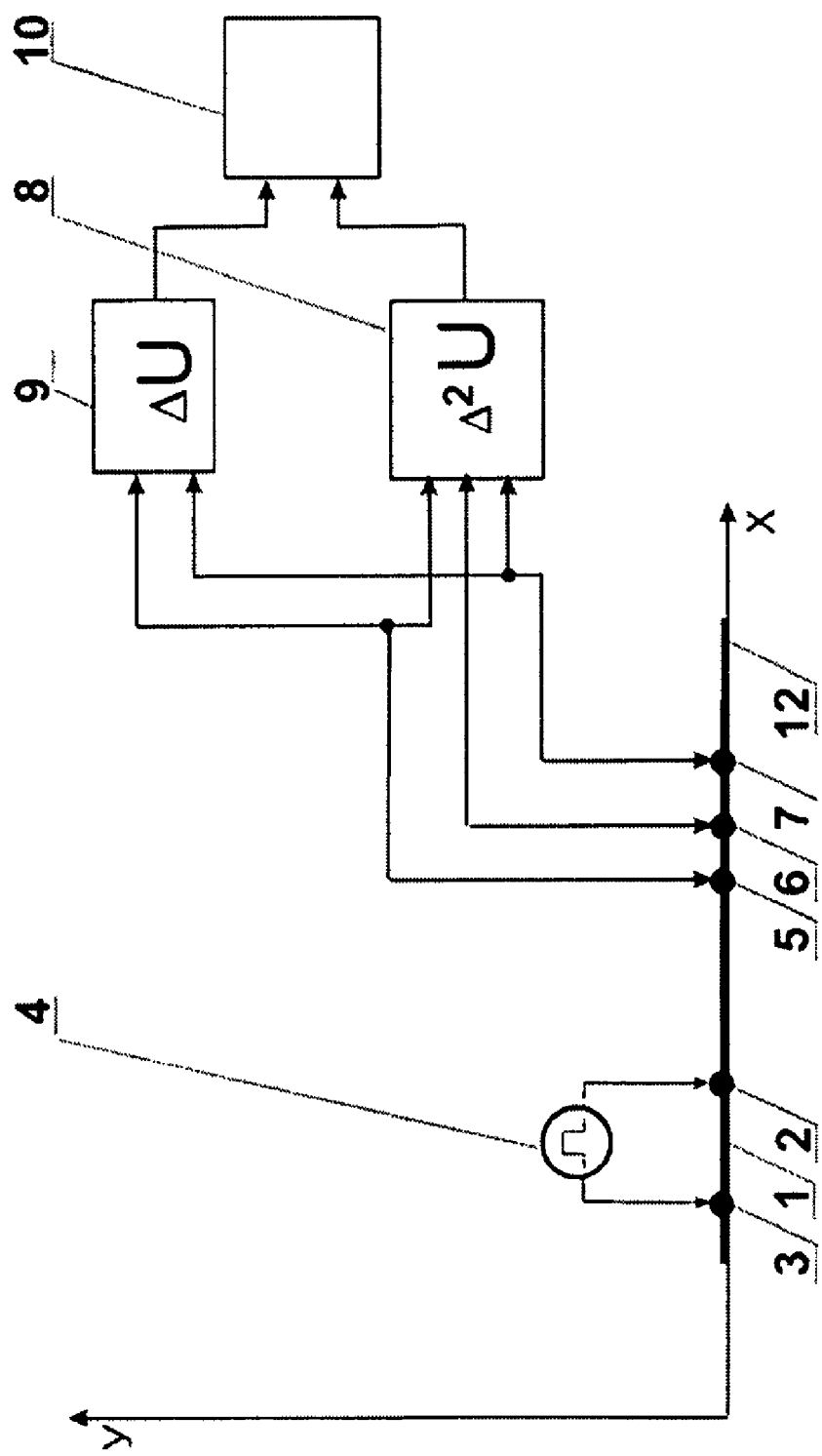
FIG. 3 shows a block-scheme of a probe device according to a second embodiment of the proposed method.

FIG. 3 shows the block-scheme of the probe device for implementation of the second embodiment of this method. A rectangular probe profile 12 is depicted thereon.

Figure 4:
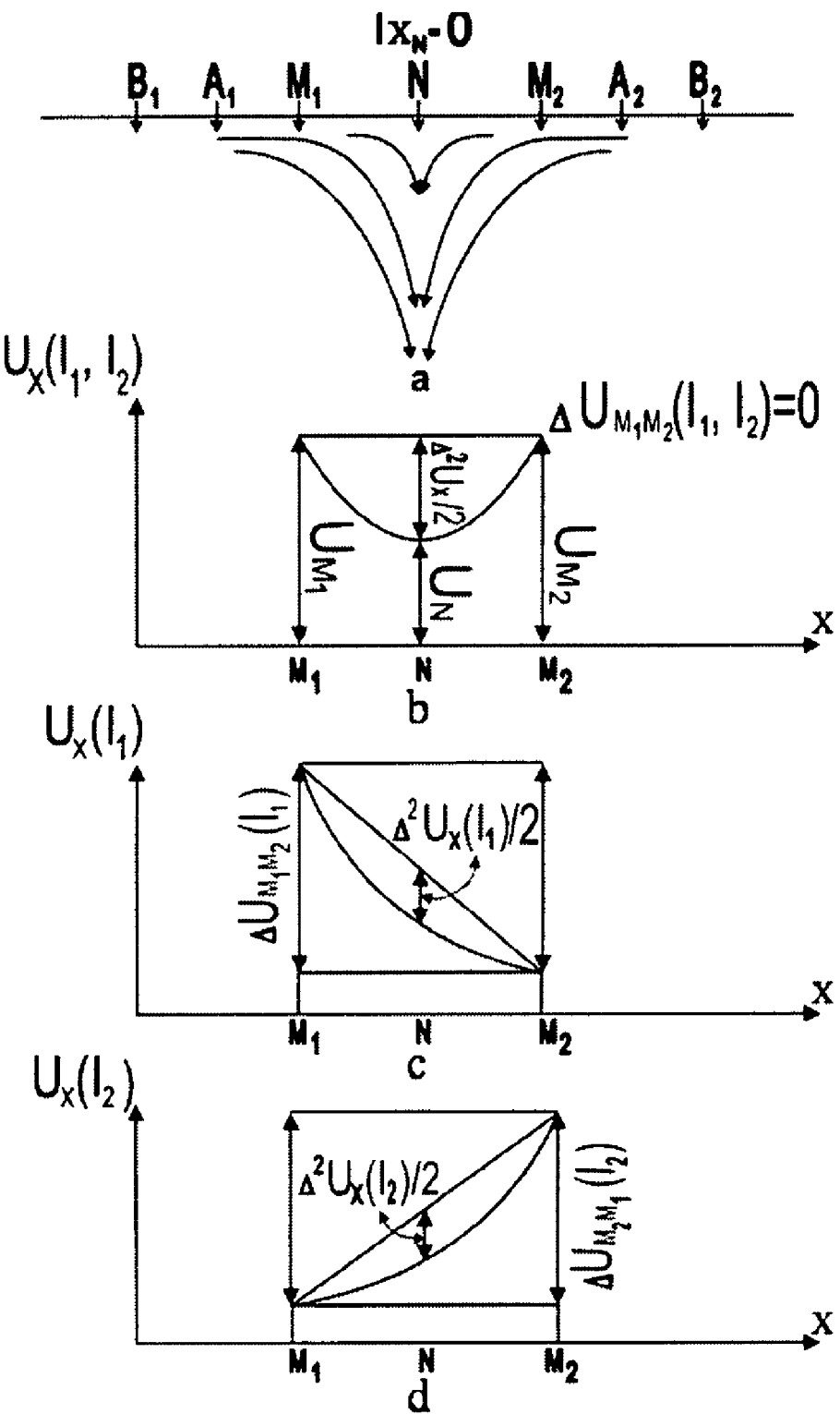
FIG. 4 shows electric field lines in a homogeneous medium, with the focusing of electric current.

FIG. 4 illustrates waveforms of electric field in a homogeneous medium, wherein:

(a) is the waveform of current lines when using the current focusing, providing the potential difference $\Delta U_{M_1 M_2}$ equal to zero; (b) is the waveform of electric field in the area of the measuring electrodes $M_1 M_2$ for the current focused by using dipoles $B_1A_1$ and $A_2B_2$; (c) is the waveform of electric field in the area of the measuring electrodes $M_1M_2$ when excitation of the medium is provided by a single current dipole $B_1A_1$, without any current focusing; (d) is the waveform of electric field in the area of the measuring electrodes $M_1M_2$ when excitation of the medium is provided by a single current dipole $A_2B_2$, without any current focusing.

Figure 5:
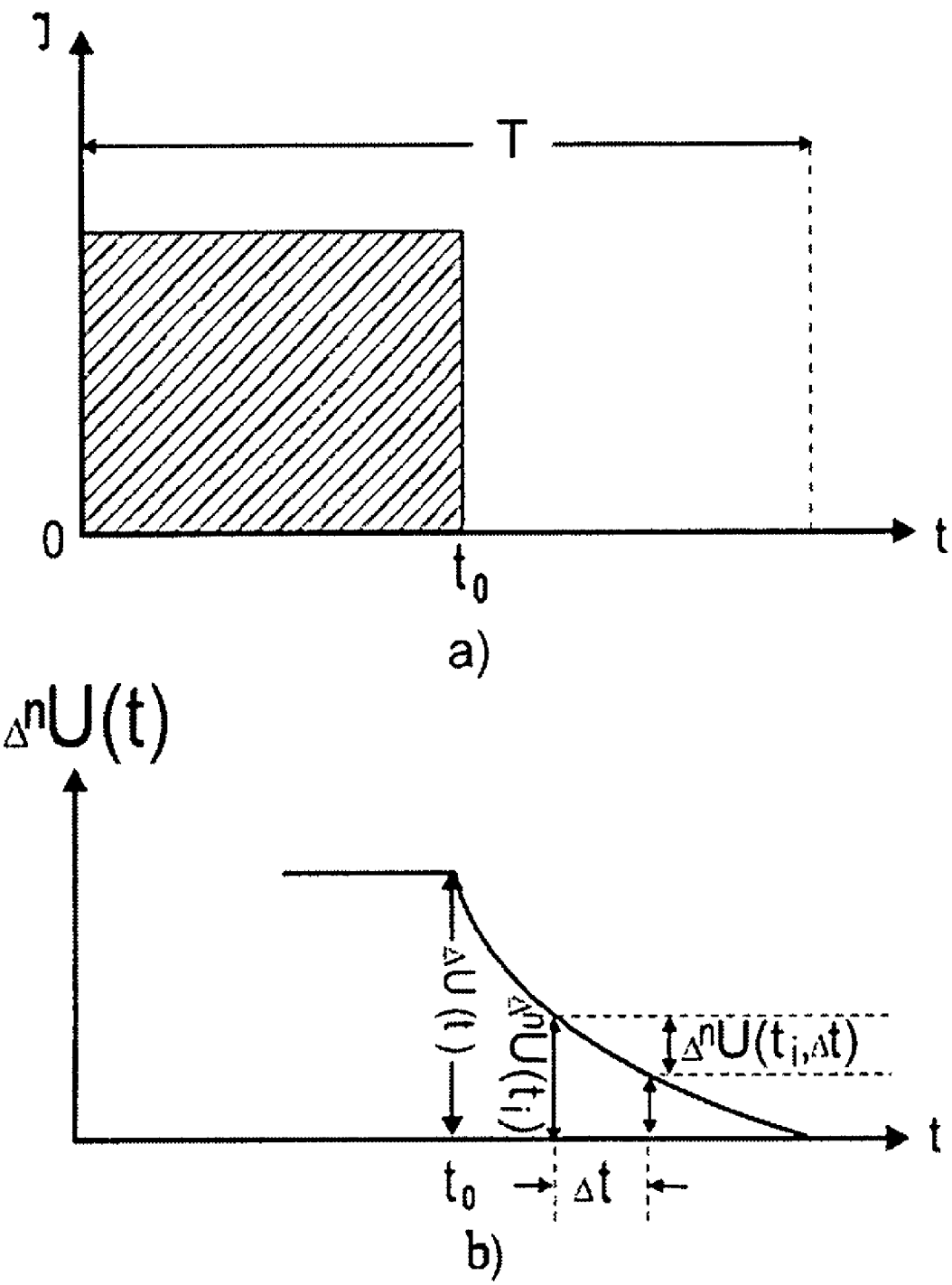
FIG. 5 illustrates the shape of a single pulse as a function of time: a) the shape of a single rectangular current pulse in a dipole source AB; b) the first and the second differences of electric potentials.

FIG. 5(a) illustrates a waveform of a single rectangular current pulse J of the dipole source AB, as a function of time t. A period of the current pulse is referred to as T.

FIG. 5(b) shows a waveform of a pulse $\Delta''U$. One of the $\Delta''U(t_i, \Delta t)$ values is also shown at the time interval $\Delta t$, within the current pause.

Analysis of Method Embodiments

Let us consider the basics of the proposed method, its realization, and new possibilities of marine geological EM survey.

Within the proposed first embodiment of the marine geological electric survey method, the exclusion of a distorting influence affecting the results of probes of the depth-varying highly conductive sea water is achieved by providing the probes in a predetermined point situated on the circular probe line, by means of two single rectangular current pulses of predetermined power: the first pulse is passed by moving the probe device through this predetermined point clockwise, the second one is passed by moving it counterclockwise.

The circular profiling allows measuring the orthogonal differences of electric potentials, due to which the screening influence of the high conductive see water layer is suppressed.

The proposed second embodiment of the method is intended for offshore probes along straight-line profiles, for small depths of sea shelf, not exceeding 250 m.

It is well known that electromagnetic field in a low conductive medium propagates in time domain according to a differential decay wave equation of mathematical physics for electric field intensity that follows from the first and the second Maxwell's equations:

$$\nabla^2 E(t) = \mu\sigma_o \frac{\partial E(t)}{\partial t} + \mu\varepsilon \frac{\partial^2 E(t)}{\partial t^2}, \quad (2)$$

where:

$\nabla^2$ is the Laplacian;

E is the electric field intensity, in V/m;

$\mu$ is the magnetic permeability, which is constant for non-magnetic media, e.g., sedimentary geological rocks, and equal to $4\pi \cdot 10^{-7}$ Henry/m.;

$\sigma_0$ is the electric conductivity, in Simens/m;

$\in$ is the dielectric permittivity, in farad/m.

(referring to Govorkov, V. A., "Electric and magnetic fields", Moscow, Gosenergoizdat, 1960, pp. 257-263).

In highly conductive media that is typical for sedimentary rocks, $\sigma_o$ is much greater than $\in$ is small at low frequencies, and thus the second member in the right hand side of the equation (2) is much smaller, and can be disregarded. (Vanyan, L. L., "Fundamentals of electromagnetic prospecting", Moscow, "Nedra", 1965, pp. 28-30). Physically, it means that electric displacement currents can be disregarded in the conductive media, since they are significantly smaller comparing to conductivity currents. Thusly, the equation (2) takes the form of:

$$\nabla^2 E(t) = \mu\sigma \frac{\partial E(t)}{\partial t}. \quad (3)$$

In geological EM survey, this equation has a solution only in the case of one-dimensional axially-symmetrical media, in particular, for sub-horizontally-layered media with unlimited boundaries.

In reality, the geological formation medium is practically always three-dimensional and heterogeneous because of: first, due to the presence of local near-surface heterogeneities, and, second, the electro-physical parameters of geological formation often continuously vary along the probe profile. However, as mentioned above, the equation (3) can be solved only for one-dimensional axially-symmetrical media, including a medium with sub-horizontally flat-parallel boundaries.

Thus, the solution of the equation (3) survey can be reliably used to solve the inverse problem of EM survey for exploration and delineation of oil and gas deposits only if the field measurements are performed with using the focusing of the electric current of an electromagnetic field source, because the propagation of the field of two sources $AB_{forward}$ and $AB_{backward}$ below the point N practically always identical for both a heterogeneous 3D medium and a 1D medium with sub-horizontally flat-parallel boundaries.

In the one-dimensional horizontally-layered medium, if the currents in both excitation dipoles are equal, the sum of two measurements is obviously equal to zero, due to the symmetry, as follows:

$$\Delta U(I_{AB})_{forward} + \Delta U(I_{AB})_{backward} = 0, \quad (4)$$

where:

$\Delta U(I_{AB})_{forward}$ is the potential difference in the measurement point N, caused by current $I_{AB_{forward}}$ of the dipole AB while moving forward, $\Delta U(I_{AB})_{backward}$—is the potential difference in the measurement point N, caused by current $I_{AB_{backward}}$ of the dipole AB while moving backward.

The equation (4) means that, according to Ohm's law, the summarized axial component of the current density $j_y$ (for the first embodiment of the proposed method) or jx (for its second embodiment) in the given medium under the point N is equal to zero according to the principle of superposition.

Therefore the current is focused under the measuring point so that the effect of the axial component of the current density j is canceled.

However, in reality, since geological formations are often a 3D heterogeneous medium, the condition (4) may be not valid, even if the currents $I_{AB_{forward}}$ and $I_{AB_{backward}}$ are equal.

Namely, in 3D heterogeneous media $\Delta U(I_{AB})_{forward}$ and $\Delta U(I_{AB})_{backward}$ may differ in amplitudes in κ times, i.e. while the probe device is moving forwards, the first and the second potential differences will be $\Delta U(I_{AB})_{forward}$ and $\Delta^2 U(I_{AB})_{forward}$ respectively, but while moving backwards they will be $\kappa \cdot \Delta U(I_{AB})_{backward}$ and $\kappa \cdot \Delta^2 U(I_{AB})_{backward}$.

To efficiently focus the current in a 3D heterogeneous medium, in order to cancel the effect of the axial current density component j under the measurement point, the expression (4) has to look as follows:

$$\Delta U(I_{AB})_{forward} - \kappa \Delta U(I_{AB})_{backward} = 0 \quad (5)$$

To provide the cancellation of the axial current density component j under the measurement point N, the following formulas for measured EM parameters were constructed:

$$\frac{\Delta^2 U_y(t_i)_{forward} + \kappa(t_i) \cdot \Delta^2 U_y(t_i)_{backward}}{\Delta U_y(t_i)_{forward}}, \quad (6)$$

where:

$\kappa(t_i)$—is a coefficient resulting from the equation:

$$\Delta U_y(t_i)_{forward} - \kappa(t_i) \cdot \Delta U_y(t_i)_{backward} = 0; \quad (6a)$$

that follows from the condition of the equality to zero of the resultant axial potential difference of the electric field along the profile line within the limits of a measurement zone of the probe device's electrodes.

The expression (6) does not depend on the intensity of the source currents $I_{ABforward}$ or $I_{ABbackward}$ in a 3D heterogeneous medium in any spatial point in the direction of vertical coordinate z under the measurement point N in a plane perpendicular to the axis extending through the electrodes $M_1 M_2$ during the entire time period of transient process, provides the equality to zero of the axial current density component j(t). This property does not depend on either the factor κ is changing during the transient process time t or not.

Due to this, a shoulder effect can be eliminated when solving the inverse problem, so that under the measurement point N, the electric field in a 3D heterogeneous medium, described in the formula (6) always practically coincides with the 1D horizontally-layered medium with unlimited boundaries. This allows solving the inverse problem in the measurement point N for a 3D heterogeneous medium applying a known theoretical solution for a 1D medium with horizontally-layered boundaries.

There exist other methods for equalizing potentials of the ending measuring electrodes: grouping the current electrodes, grouping the measuring electrodes, etc. A group of measuring electrodes may be modified, e.g. four electrodes may be used instead of three ones. Multipolar sources may be applied to adjust the penetration depth of the vertical current density jz(t) and determination of vertical changing of the formation. The size of the probe device may be changed. However, independently of the device modification, the fundamental provision of the proposed method is the equality to zero of the resultant first difference of electric field potentials at its measuring base that allows excluding the effect of the axial component of the current density j(t).

It's worth to note that the equation (3) describes the propagation of electromagnetic field in a conductive non-polarizable medium. It is known in mathematical physics as a diffusion or heat-conduction equation, and is commonly used in resistivity methods of geophysics to study the penetration of the EM field into the depth of a surveyed geological formation.

Herewith, it is considered that the electric conductivity $\sigma_o$ of a geologic horizontal layer is the main and practically the only parameter determining the medium electric properties. It is assumed to be constant for each layer and not depending on the excitation frequency of the electromagnetic field. However, the sedimentary rocks excited with alternative low frequency current, deployed in the excitation in geophysics, are also characterized by the induced polarization coefficient η. The induced polarization is a dimensionless quantity depending on the electrochemical activity of the sedimentary rocks. It is defined as a ratio of the potential difference measured on the core sample in 0.5 sec. after the current is switched off ($\Delta U_{IP}$) to the potential difference before the current switch-off ($\Delta U$). Frequently, this ratio is expressed as a percentage as follows:

$$\eta(t = 0.5 \text{ sec}) = \frac{\Delta U_{IP}(t = 0.5 \text{ sec})}{\Delta U} \cdot 100\%. \quad (7)$$

The induced polarization of sedimentary rocks has a unique stability among other physical parameters, and practically does not depend on the rock composition and its temperature. For ion-conductive (sedimentary) rocks, it depends on several factors: water saturation and porosity, composition and concentration of a solution in the rock pores, the structure and soze of pores, clay content, etc. (Komarov, V. A., "Electric survey with polarization method", Leningrad, Nuaka, 1980, p. 392). The most important feature is that, as shown by the wide practical application of the proposed method to various geological environments, the induced polarization effect supplies important information about the presence of highly polarizable oil and gas deposits in the geological formations.

Several researches show (W. H. Pelton, S. H. Ward, P. G. Hallof, W. R. Sill and P. H. Nelson. Mineral discrimination and removal of inductive coupling with multifrequency IP, Geophysics 43, 1978, pp. 588-603) that the electric conductivity of geological rocks is not constant, but depends on the induced polarization and the excitation frequency of the electric field. Particularly, Cole, K. S. and Cole, R. H. proposed an empirical formula $$\sigma(i\omega, \sigma_o, \eta, \tau) = \sigma_o \left(1 - \frac{\eta}{1 + (i\omega\tau)^c}\right), \quad (8)$$

where the electric conductivity depends on ω, $\sigma_o$, η, and τ, where

η is the induced polarization coefficient, a dimensionless quantity, expressed commonly as percentage;

τ is the time decay constant determining the decay of the potential difference due to the induced polarization, in seconds;

ω is the harmonic frequency of electric field excitation, Hz;

c is a dimensionless power index, though not being a physical parameter, but σ(iω,$\sigma_o$,η,τ) depends on it.

Unlike the dielectric permittivity $\in$, the induced polarization coefficient η caused by low frequency EM excitation, may have significant effect, as compared with the effect of the electric conductivity $\sigma_o$ for sedimentary rocks for high frequency currents, where the induced polarization is not observed, as seen from the formula (8). Hence, it cannot be ignored at low frequencies, and should be taken into account when doing EM survey for delineating oil and gas deposits, when the formation is excited by low frequency alternating current.

It is well known (Electric survey, Geophysician's handbook, Khmelevsky, V. K. et al, Moscow, Nedra, 1989, Book II, pp. 99-102), that for certain sedimentary geological rocks in 0.5 sec. after the excitation current switch-off, the magnitude of the potential difference, caused by the induced polarization, though continuously decreasing, still remains at a level of 0.2-10% of the of the potential difference magnitude of the forward field, related to the conductivity $\sigma_o$, measured, as described above, for high frequency currents, when the induced polarization is not observed. To keep the form of expression (8), the equation (3) can be written as follows below.

Taking into account that $$\dot{E}(i\omega) = E_m \cdot e^{i\omega t}, \quad (9)$$
$$\frac{\partial E(t)}{\partial t} \Leftrightarrow i\omega \cdot \dot{E}(i\omega)$$

and $$\frac{\partial^2 E(t)}{\partial t^2} \Leftrightarrow -\omega^2 \cdot \dot{E}(i\omega), \quad (10)$$

neglecting the dielectric permittivity term, due to the low frequency, equation (3) in frequency domain may be represented in the following form:

$$\nabla^2 \dot{E}(i\omega) = i\omega\mu\sigma \cdot \dot{E}(i\omega), \quad (11)$$

Since the conductivity of sedimentary rocks is variable, and depends on the induced polarization and excitation frequency according to the formula (8), then the equation (11) incorporating the formula (8) acquires four determining properties of the polarized medium: $\sigma_o$, $\eta$, $\tau$, and c parameters rather than single $\sigma_0$, and for a harmonic function of the electromagnetic field in time can be expressed as follows:

$$\nabla^2 \dot{E}(i\omega) = i\omega\mu\sigma_o \left[1 - \frac{\eta}{1 + (i\omega\tau)^c}\right] \cdot \dot{E}(i\omega), \quad (12)$$

or in a general case of arbitrary frequency dependence, taking into account the formula (8):

$$\nabla^2 \dot{E}(i\omega) = i\omega\mu\sigma(i\omega, \sigma_0, \eta, \tau) \cdot \dot{E}(i\omega) \quad (13)$$

The replacing of the frequency-independent electric conductivity $\sigma$ in the equation (11) by the frequency-dependent one $\sigma(i\omega)$ in the equation (13) is mathematically rigorous and proven theoretically (Kulikov, A. K., Shemyakin, E. A., "Electric survey using phase induced polarization method", Moscow, Nedra, 1978, pp. 24-26) and (Wait, J. R., Geo-electro-magnetics, trans. In Russ., Moscow, Nedra, 1987, pp. 61-62).

In the proposed method, the problem of detection of oil and gas deposits in the investigated formation is solved as the inverse mathematical problem according to the equation (13) as a function of the depth of penetration of the electric field depending on time, with respect to three independent medium parameters: electric conductivity $\sigma_o$; induced polarization coefficient $\eta$; time decay constant $\tau$, and the relaxation constant c, following from the empirical formula (8).

In the first embodiment of the proposed method, this inverse problem is solved by using the set of measured (at least three) current-source-independent normalized electrical parameters:

$$\frac{\Delta^2 U_y(t_i)_{forward} + \kappa(t_i) \cdot \Delta^2 U_y(t_i)_{backward}}{\Delta U_y(t_i)_{forward}}, \quad (14)$$

$$\frac{\Delta^2 U_y(t_i, \Delta t)_{forward} + \kappa(t_i) \cdot \Delta^2 U_y(t_i, \Delta t)_{backward}}{\Delta U_y(t_i)_{forward}},$$

$$\frac{\Delta^2 U_y(t_i, \Delta t)_{forward} + \kappa(t_i, \Delta t) \cdot \Delta^2 U_y(t_i, \Delta t)_{backward}}{\Delta U_y(t_i, \Delta t)_{forward}},$$

within the current pauses at time moments $t_i(0 \leq i \leq n)$, i.e. $t_o$, $t_o + \Delta t$, $t_o + 2\Delta t$, $t_o + 3\Delta t$ etc., up to $t_o + n\Delta t$, while the transient signal still exists and based on the differential equation of mathematical physics (13) for intensity of electric field of a dipole source in an electro-chemical polarizable conductive medium. For example, one of such methods is a method of trial (Tikhonov, A. N., Arsenin, V. Ya., The solution methods of incorrect problems, Moscow, Nauka, 1979, pp. 37-43) to solve this inverse problem can be used.

Therefore, to reduce the number of trials, existing prior data of the model of the geological formation can be used: for example, the data of drilling stratigraphic test wells that usually are available, or the seismic survey data when they are available for the regions of interest. In case when the prior data about the formation are not available (that happens often enough), the inverse problem is solved in the same way but with an increased number of trials.

As a result of solving the inverse problem, a model of the medium is obtained, which reflects the real geometry of the formation and includes the parameters $\sigma_o$, $\eta$, and $\tau$ of each layer. The method allows separating these three parameters.

Finally, three images of $\sigma_o$, $\eta$ and $\tau$ are plotted—at the vertical coordinate: as a time function of the transient process in the pause of current functionally related with the depth of field penetration, that is the depth of each horizontal layer found as a result of the solution of the reverse problem of the medium model; —at the horizontal coordinate: as a distance function between the probe points on the sea surface along a surveyed profile; the values of the electro-physical parameters $\sigma_o$, $\eta$ and $\tau$ of equation (13) are presented for a numeral color scale applied to each probe point according to a color gamma.

To suppress interferences, a sequential group probing in several neighboring points at predetermined sections of the profile throughout the entire profile. The so determined normal electrical parameters for each group of probing are summarized, and the following averaged values are obtained:

$$\frac{1}{n}\sum_1^n \frac{\Delta^2 U_y(t_i)_{forward} + \kappa(t_i) \cdot \Delta^2 U_y(t_i)_{backward}}{\Delta U_y(t_i)_{forward}}, \quad (15)$$

$$\frac{1}{n}\sum_1^n \frac{\Delta^2 U_y(t_i, \Delta t)_{forward} + \kappa(t_i) \cdot \Delta^2 U_y(t_i, \Delta t)_{backward}}{\Delta U_y(t_i)_{forward}},$$

$$\frac{1}{n}\sum_1^n \frac{\Delta^2 U_y(t_i, \Delta t)_{forward} + \kappa(t_i, \Delta t) \cdot \Delta^2 U_y(t_i, \Delta t)_{backward}}{\Delta U_y(t_i, \Delta t)_{forward}},$$

where: n is the number of probe points in each probing group and the sums are used for the solution of the inverse problem.

For the second embodiment of the proposed method, the inverse problem is solved using the entire set of the three current-source-independent normalized electrical parameters:

$$\frac{\Delta^2 U_x(t_i)_{forward} + \kappa(t_i) \cdot \Delta^2 U_x(t_i)_{backward}}{\Delta U_x(t_i)_{forward}}, \quad (16)$$

$$\frac{\Delta^2 U_x(t_i, \Delta t)_{forward} + \kappa(t_i) \cdot \Delta^2 U_x(t_i, \Delta t)_{backward}}{\Delta U_x(t_i)_{forward}},$$

$$\frac{\Delta^2 U_x(t_i, \Delta t)_{forward} + \kappa(t_i, \Delta t) \cdot \Delta^2 U_x(t_i, \Delta t)_{backward}}{\Delta U_x(t_i, \Delta t)_{forward}},$$

or, the summarized normalized parameters are used in presence of electrical interferences:

$$\frac{1}{n}\sum_{1}^{n}\frac{\Delta^2 U_x(t_i)_{forward} + \kappa(t_i)\cdot\Delta^2 U_x(t_i)_{backward}}{\Delta U_x(t_i)_{forward}}, \quad (17)$$

$$\frac{1}{n}\sum_{1}^{n}\frac{\Delta^2 U_x(t_i,\Delta t)_{forward} + \kappa(t_i)\cdot\Delta^2 U_x(t_i,\Delta t)_{backward}}{\Delta U_x(t_i)_{forward}},$$

$$\frac{1}{n}\sum_{1}^{n}\frac{\Delta^2 U_x(t_i,\Delta t)_{forward} + \kappa(t_i,\Delta t)\cdot\Delta^2 U_x(t_i,\Delta t)_{backward}}{\Delta U_x(t_i,\Delta t)_{forward}},$$

Survey of oil and gas fields with the application of the proposed method shows that in presence of oil or gas deposits, all the three parameters (the specific electric conductivity $\sigma_o$, the induced polarization coefficient $\eta$, and the time decay constant $\tau$) reflect anomaly associated with oil or gas reservoir, independently of the type of trap or its geometry, even on the deep water shelf.

Exemplary Implementations

FIG. 1 and FIG. 3 illustrate block-schemes of probe devices for realization of both embodiments of the proposed method. The block-schemes show the current dipole AB (2 and 3) located in the water 1 that is connected to the generator 4 of rectangular current pulses. The devices comprise two measuring sensors $M_1M_2$ (5 and 7) and $M_1NM_2$ (5, 6, and 7) used to measure the first and the second differences of electric potentials. The magnitudes of the measured differences are amplified by digital sensors (including amplifiers) 8 and 9 and processed by the block 10 to obtain magnitudes, according to the expressions (14), (15), (16), and (17).

Setups of the probe devices used in the first and in the second embodiments are similar. Only the probe methods are different. In the first embodiment, designed for deep-water cases (250 m-1000 m) the probes are performed along the circular profile line 11 (FIG. 2). In the second embodiment, designed for shallow shelf cases, if the sea water depth does not exceed 250 m, the probes are performed along strait lines profiles 12 (FIG. 3).

The forward and backward indexes in the expressions (14), (15), (16), and (17) denote the measurement of electrical parameters in any probe point are carried out, when the probe device is moving forward and backward along the probe line.

The proposed method is realized deploying a system of excitation, measuring, and processing apparatus. The survey, accomplished by the proposed method on oil and gas deposits of sea shelf, shows that when such deposits are present, all three parameters $\sigma_o$, $\eta$, and $\tau$, in the limits of the deposit contour, reflect an anomaly at the depth of deposit location, associated with the oil or gas deposit, independently on the type of trap or its geometry. The method provides an essential economical effect for the survey and exploration of hydrocarbon deposits.

The invention claimed is:

1. A marine geological EM survey method comprising the steps of:

excitation of electromagnetic field in a surveyed medium by passing rectangular current pulses therethrough, with pauses therebetween, and measured along series of circularly shaped probe profiles, the pulses are passed from a dipole electric source located on one of the circular profiles, wherein two identical rectangular pulses are passed through the medium, as follows: a first pulse is passed by moving the probe device clockwise, and the second pulse is passed by moving the probe device in the counterclockwise direction;

measuring a first and a second differences of electric potentials during the pauses, while the transient signal still exists, with a constant time interval, at every probe point located behind the dipole source being towed at the angular distance of 90 degree along the profile line, wherein the following condition is provided: the resultant axial potential difference along the profile is equal to zero, to eliminate the effect of the axial component of the current density under the probe point;

obtaining a focusing coefficient $\kappa(t_i)$ from the equation:

$$\Delta U_y(t_i)_{forward} - \kappa(t_i)\cdot\Delta U_y(t_i)_{backward} = 0;$$

three sets of the dipole-source-independent normalized EM parameters are calculated from the measured differences of electric potentials:

$$\frac{\Delta^2 U_y(t_i)_{forward} + \kappa(t_i)\cdot\Delta^2 U_y(t_i)_{backward}}{\Delta U_y(t_i)_{forward}},$$

$$\frac{\Delta^2 U_y(t_i,\Delta t)_{forward} + \kappa(t_i)\cdot\Delta^2 U_y(t_i,\Delta t)_{backward}}{\Delta U_y(t_i)_{forward}},$$

$$\frac{\Delta^2 U_y(t_i,\Delta t)_{forward} + \kappa(t_i,\Delta t)\cdot\Delta^2 U_y(t_i,\Delta t)_{backward}}{\Delta U_y(t_i,\Delta t)_{forward}},$$

where:

$\Delta t$ is a time interval between two nearest measurements of instant electric potential differences during the transient process signals existence;

$\Delta U_y(t_i)_{forward}$, $\Delta U_y(t_i)_{backward}$, $\Delta^2 U_y(t_i)_{forward}$, $\Delta^2 U_y(t_i)_{backward}$—are instant magnitudes of the first and second differences of the electric potential, measured at the probe point located at the circular probe line, at the angular distance of 90 degree with respect to the center of the dipole source, during the current pauses in the equal time intervals $\Delta t$, while the transient signals still exist, by clockwise and counterclockwise movement of the probe device;

$\Delta U_y(t_i,\Delta t)_{forward}$, $\Delta U_y(t_i,\Delta t)_{backward}$, $\Delta^2 U_y(t_i,\Delta t)_{forward}$, $\Delta^2 U_y(t_i,\Delta t)_{backward}$—are the magnitudes of the differences between two nearest in time instant magnitudes of the first and the second differences of the electric potentials of the transient process with the time intervals $\Delta t$;

performing group probe measurements at predetermined neighboring profile points along the entire profile line, and normalized EM measured parameters for each group are summarized, and the following average values are obtained:

$$\frac{1}{n}\sum_{1}^{n}\frac{\Delta^2 U_y(t_i)_{forward} + \kappa(t_i)\cdot\Delta^2 U_y(t_i)_{backward}}{\Delta U_y(t_i)_{forward}},$$

$$\frac{1}{n}\sum_{1}^{n}\frac{\Delta^2 U_y(t_i,\Delta t)_{forward} + \kappa(t_i)\cdot\Delta^2 U_y(t_i,\Delta t)_{backward}}{\Delta U_y(t_i)_{forward}},$$

$$\frac{1}{n}\sum_{1}^{n}\frac{\Delta^2 U_y(t_i,\Delta t)_{forward} + \kappa(t_i,\Delta t)\cdot\Delta^2 U_y(t_i,\Delta t)_{backward}}{\Delta U_y(t_i,\Delta t)_{forward}},$$

where:
n is a number of probe points in each of groups;
using said values and the differential equation of mathematical physics for electric field of a dipole source in an electrochemically polarizing conductive medium $$\nabla^2 \dot{E}(i\omega) = i\omega\mu \cdot \sigma(i\omega,\sigma_0,\eta,\tau) \cdot \dot{E}(i\omega),$$

where:
$\nabla^2$ is the Laplas operator,
$\dot{E}(i\omega)$ is an electric field excited by a dipole source, expressed for an equation for harmonic alterations of the electric field in time;
$\sigma(i\omega,\sigma_0,\eta,\tau)$ is a frequency-dependent electric conductivity of the medium,
$\sigma_0$ is an electric conductivity of the medium, regardless the influence of the induced polarization,
$\eta$ is a coefficient of induced polarization,
$\tau$ is a time decay constant for potential difference due to induced polarization;
solving an inverse mathematical problem to determine three electro-physical parameters proprietary for each element of the medium: the electric conductivity $\sigma_0$, the coefficient of induced polarization $\eta$, and the time decay constant for potential difference $\tau$; and
plotting three cross-sections graphs of these parameters in the time domain.

2. A marine geological EM survey method comprising the steps of:
excitation of electromagnetic field within a surveyed medium along an axis of a strait line probe profile, by passing rectangular current pulses therethrough, with pauses therebetween, and measured along series of circularly shaped probe profiles, the pulses are passed from a dipole electric source located on one of the circular profiles, wherein two identical rectangular pulses are passed through a surveyed medium, as follows: a first pulse is passed by moving the probe device clockwise, and the second pulse is passed by moving the probe device in the counterclockwise direction;
measuring instantaneous values of a first and a second axial electrical potential differences with a constant time interval at each probe point during the entire time of existence of transient process signals;
providing the resulting axial difference of electrical potentials to be zero along the probe line to neglect the axial component of the current density under the probe point.
estimating a focusing coefficient $\kappa(t_i)$ from the equation $$\Delta U_x(t_i)_{forward} - \kappa(t_i) \cdot \Delta U_x(t_i)_{backward} = 0;$$

calculating three sets of normalized electrical parameters independent on the dipole source's current intensity:

$$\frac{\Delta^2 U_x(t_i)_{forward} + \kappa(t_i) \cdot \Delta^2 U_x(t_i)_{backward}}{\Delta U_x(t_i)_{forward}},$$

$$\frac{\Delta^2 U_x(t_i, \Delta t)_{forward} + \kappa(t_i) \cdot \Delta^2 U_x(t_i, \Delta t)_{backward}}{\Delta U_x(t_i)_{forward}},$$

$$\frac{\Delta^2 U_x(t_i, \Delta t)_{forward} + \kappa(t_i, \Delta t) \cdot \Delta^2 U_x(t_i, \Delta t)_{backward}}{\Delta U_x(t_i, \Delta t)_{forward}},$$

where:
$\Delta t$ is a constant time interval between two nearest values of electrical potential differences during the existence of the transient process signals;
$\Delta U_x(t_i)_{forward}$, $\Delta U_x(t_i)_{backward}$, $\Delta^2 U_x(t_i)_{forward}$, $\Delta^2 U_x(t_i)_{backward}$ are instantaneous values of the first and the second differences of the axial electrical potentials measured with the time interval $\Delta t$ in the current pauses during the entire time of existence of the transient process signals when the probe device moves forwards and backwards along the probe profile line;
$\Delta U_x(t_i,\Delta t)_{forward}$, $\Delta U_x(t_i,\Delta t)_{backward}$, $\Delta^2 U_x(t_i,\Delta t)_{forward}$, $\Delta^2 U_x(t_i,\Delta t)_{backward}$ are differences between nearest instantaneous values of the first and the second axial differences of the transient process electrical potentials measured within the time interval $\Delta t$;
performing the measurements in groups of neighboring probe points at certain regions of the probe line along its entire length;
summarizing normalized electrical parameters for each of groups of probe points to obtain the following average values:

$$\frac{1}{n}\sum_1^n \frac{\Delta^2 U_x(t_i)_{forward} + \kappa(t_i) \cdot \Delta^2 U_x(t_i)_{backward}}{\Delta U_x(t_i)_{forward}},$$

$$\frac{1}{n}\sum_1^n \frac{\Delta^2 U_x(t_i, \Delta t)_{forward} + \kappa(t_i) \cdot \Delta^2 U_x(t_i, \Delta t)_{backward}}{\Delta U_x(t_i)_{forward}},$$

$$\frac{1}{n}\sum_1^n \frac{\Delta^2 U_x(t_i, \Delta t)_{forward} + \kappa(t_i, \Delta t) \cdot \Delta^2 U_x(t_i, \Delta t)_{backward}}{\Delta U_x(t_i, \Delta t)_{forward}},$$

where: n is the number of probe points in a group;
solving a mathematical inverse problem through using these values and the following differential equation of the mathematical physics describing the intensity of an electrical field induced by a dipole source in a electrochemical polarizing conductive medium $$\nabla^2 \dot{E}(i\omega) = i\omega\mu \cdot \sigma(i\omega\sigma_0\eta\tau) \cdot \dot{E}(i\omega),$$

where:
$\nabla^2$ is the Laplacian,
$\dot{E}(i\omega)$ is the intensity of the electrical field induced by a dipole source expressed in the equation for the case of harmonic changes of the field intensity in time,
$\sigma(i\omega\sigma_0\eta\tau)$ is the frequency dependent electro-conductivity of medium's elements,
$\sigma_0$ is the electro-conductivity of the medium's elements without taking into account the induced polarization,
$\eta$ is the induced polarization coefficient,
$\tau$ is the fall-time constant of the induced polarization potential difference;
to estimate three electro-physical parameters characterizing each of the medium's elements: the specific electro-conductivity $\sigma_0$, the induced polarization $\eta$, and the fall-time constant of the induced polarization potential difference $\tau$; and
plotting three cross-sections graphs of these parameters in the time domain.

* * * * *